(12) United States Patent
Quenneville et al.

(10) Patent No.: US 7,722,348 B1
(45) Date of Patent: May 25, 2010

(54) VACUUM ASSISTED MOLDING

(76) Inventors: Mac A. Quenneville, 4577 131st Ave. North, Clearwater, FL (US) 33762; Stephen M. Quenneville, 15353 George Blvd., Clearwater, FL (US) 33760

( * ) Notice: Subject to any disclaimer, the term of this patent is extended or adjusted under 35 U.S.C. 154(b) by 401 days.

(21) Appl. No.: 11/967,340

(22) Filed: Dec. 31, 2007

(51) Int. Cl.
*B29C 70/48* (2006.01)
(52) U.S. Cl. .................. 425/121; 425/129.1; 425/434; 425/543
(58) Field of Classification Search .............. 425/121, 425/129.1, 425, 434, 543
See application file for complete search history.

(56) References Cited

U.S. PATENT DOCUMENTS

| | | | | |
|---|---|---|---|---|
| 3,074,111 A | * | 1/1963 | Wiltshire | 425/129.1 |
| 4,043,721 A | * | 8/1977 | Lemelson | 425/129.1 |
| 4,063,863 A | * | 12/1977 | Hilmoe | 425/425 |
| 4,350,481 A | * | 9/1982 | Corea et al. | 425/434 |
| 4,460,531 A | * | 7/1984 | Harris et al. | 264/138 |
| 5,393,215 A | * | 2/1995 | Donovan, Sr. | 425/129.1 |
| 5,741,450 A | * | 4/1998 | Monroe | 425/129.1 |
| 2007/0107220 A1 | * | 5/2007 | Bakhuis et al. | 29/889.7 |

FOREIGN PATENT DOCUMENTS

EP 1310351 A1 * 5/2003

* cited by examiner

*Primary Examiner*—Robert B Davis
(74) *Attorney, Agent, or Firm*—Ronald E. Smith; Smith & Hopen, P.A.

(57) ABSTRACT

A mold assembly includes a mold mounted for rotation within a vacuum chamber. The mold includes a central drum having a hollow interior into which resin is poured. A plurality of hollow blade molds is radially disposed about the central drum. A plurality of radially disposed struts is secured to the central drum and each strut is received within an associated blade mold. Openings are formed in the central drum and in the struts. Elongate bundles of woven fiberglass are weaved in and out of the openings, beginning in the drum and extending to the respective ends of each strut. A motor spins the mold assembly and resin in the central drum is urged by centrifugal force to flow along the length of the woven fiberglass bundles until each blade mold is filled with resin. The resulting product is a monolithic structure having plural blades radiating from a central hub.

7 Claims, 5 Drawing Sheets

VACUUM ASSISTED MOLDING

BACKGROUND OF THE INVENTION

1. Field of the Invention

This invention relates to vacuum assisted molding. More particularly, it relates to fabrication of large composite elements using an infusion system supplemented by centrifugal force in a vacuum.

2. Description of the Prior Art

The manufacturing of large molded objects, such as boat hulls, large blades for an electricity-generating wind farm windmill, and the like, is problematic. Such large objects are typically molded by a time-consuming manual process. This drives up the cost of the individual products. Items made by manual labor are also more likely to be of inconsistent quality as no two products will be exactly alike.

What is needed, then, is a new manufacturing process for making large molded monolithic products. More particularly, there is a need for a manufacturing process that reduces the amount of manual labor needed to produce such objects. The needed process would reduce the cost of such objects. There is also a need for a new process that provides products having consistently high quality.

However, in view of the art considered as a whole at the time the present invention was made, it was not obvious to those of ordinary skill in this art how the identified needs could be met.

SUMMARY OF INVENTION

The long-standing but heretofore unfulfilled need for an improved manufacturing process for making large molded objects is now met by a new, nonobvious, and useful invention.

The novel mold assembly includes a vacuum chamber having a top piece and a bottom piece that share a common structure and which form a stationary, non-rotating vacuum chamber when said top and bottom pieces are positioned in confronting relation to one another.

A mold for making a preselected monolithic part is mounted for rotation within the vacuum chamber. The mold includes a central drum having cylindrical sidewalls, a bottom wall, an open top, and a hollow interior. In a first embodiment, a cylinder having a plurality of micro perforations formed throughout the cylinder and one large opening has a diameter less than the diameter of the central drum and is positioned concentrically within the central drum so that a toroidal space is defined between said cylinder and central drum. The cylinder is pressed, welded, glued, or secured within the central drum by some other suitable means.

In a second embodiment, the micro perforated cylinder is not used. Instead, a micro perforated lid or cover is installed in closing relation to the open top of the central drum.

The cylinder of the first embodiment having the micro perforations formed therein acts as a dam to prevent overflowing of the resin that is pumped into it. The viscosity of the resin prevents it from free-flowing but does nothing to stop evacuation of air from the blade molds.

The mold further includes a plurality of hollow blade molds disposed in circumferentially spaced relation to one another about the central drum and in radial relation to a longitudinal axis of the central drum. Each of the hollow blade molds includes a top piece and a bottom piece adapted to be releasably secured to one another. The top and bottom pieces abut one another along a parting line when placed into confronting relation to one another.

A plurality of struts is secured to the central drum in circumferentially spaced relation to one another and in radial relation to the longitudinal axis of the central drum. A plurality of openings is formed in the cylindrical sidewalls of the central drum and a plurality of openings is formed in each strut of the plurality of struts.

Each elongate bundle of a plurality of elongate bundles of woven glass (preform) extends through at least one opening of the plurality of openings formed in the central drum and through at least one opening formed in an associated strut of the plurality of struts. These struts and holes prevent the glass bundles from being spun to the outside and piling up in the tip or distal end of the blade mold. In the first embodiment, the radially innermost part of each bundle of woven glass is positioned within the toroidal space between the micro perforated cylinder and the central drum. In the second embodiment, the radially innermost part of each bundle of woven glass is positioned within the hollow interior of the central drum.

The woven glass may be provided in the form of a unidirectional stitched material, or a braided, woven material. It may be preformed woven glass, i.e., material that is sewn, knitted, or otherwise secured together. The preform fiberglass bundles may include fiberglass, Kevlar®, carbon fiber, a fiber coated with metal such as boron wire, nylon, and other synthetic fibers. The fiber architecture may change depending upon the application. Thus it is understood that this invention is not limited to any particular fiber architecture because those of ordinary skill in the art may select a fiber architecture that best fits the needs of a particular application.

Each of the struts and its associated bundle of woven glass (preform) is housed by an associated top piece and bottom piece of the hollow blade molds when the top and bottom pieces are placed into confronting relation with one another and releasably secured to one another.

A resin reservoir is positioned externally of the vacuum chamber and is adapted to deliver resin or other moldable material to the hollow interior of the cylinder having the large opening and the micro perforations formed therein. A resin tube provides fluid communication between the resin reservoir and the hollow interior of the cylinder (first embodiment) or drum (second embodiment). A sealed opening formed in a center of the vacuum chamber top piece accommodates the resin tube.

A motor mounted outside of the stationary vacuum chamber is adapted to rotate the mold within the stationary vacuum chamber. The central drum sits atop a flat platform that surmounts an upstanding shaft. A sealed opening formed in a center of the vacuum chamber bottom piece accommodates the rotating shaft. A motor rotates the upstanding shaft and hence the flat platform, the central drum, and the blade molds mounted about the periphery of the central drum.

Centrifugal force created by rotation of the mold causes resin in the hollow interior of the cylinder to flow radially outwardly of the cylinder through the large opening formed therein and into the toroidal space between said cylinder and central drum in the first embodiment. In the second embodiment, there is no cylinder so the resin flows into the blade molds from the central drum. From the toroidal space, (or from the hollow interior of the central drum) the resin flows through the openings formed in the central drum and along the respective extents of the preform, until each blade mold is filled with resin. Any moldable material such as a ceramic composite material may also be used instead of resin. The micro perforations formed in the cylinder prevents the resin or other moldable material from overflowing into the vacuum chamber. The viscosity of the resin or other moldable material prevents it from flowing freely through the micro perforations.

Resin or other moldable material is not introduced into the hollow interior of the cylinder (first embodiment) or drum (second embodiment) until the air within the vacuum chamber has been substantially pumped out. Although the novel mold can be used without the vacuum chamber, the amount of centrifugal force required to drive resin to the radially outermost ends of the blade molds is greatly reduced when the air is removed prior to rotation of the mold assembly.

The novel apparatus produces a finished molded product having a monolithic structure. The finished molded product is removed from the novel apparatus by releasing the vacuum, separating the vacuum chamber top piece from the vacuum chamber bottom piece, followed by separating each blade mold top piece from each blade mold bottom piece.

A circular dam is built along a top wall of the central drum in surrounding relation to the central opening of the drum to prevent resin from spinning out of said central drum if excess resin accumulates in the cylinder and in the toroidal space. The micro perforated cylinder may be wedged by press fit into the central opening of the drum or welded into the dam.

The primary object of this invention is to provide a method for making very large structures by employing a molding process.

Another object is to provide large monolithic structures that lack seams and which therefore cannot come apart along said seams.

Still another object is to provide large structures at greatly reduced cost and consistent quality by eliminating many hours of manual labor per object.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
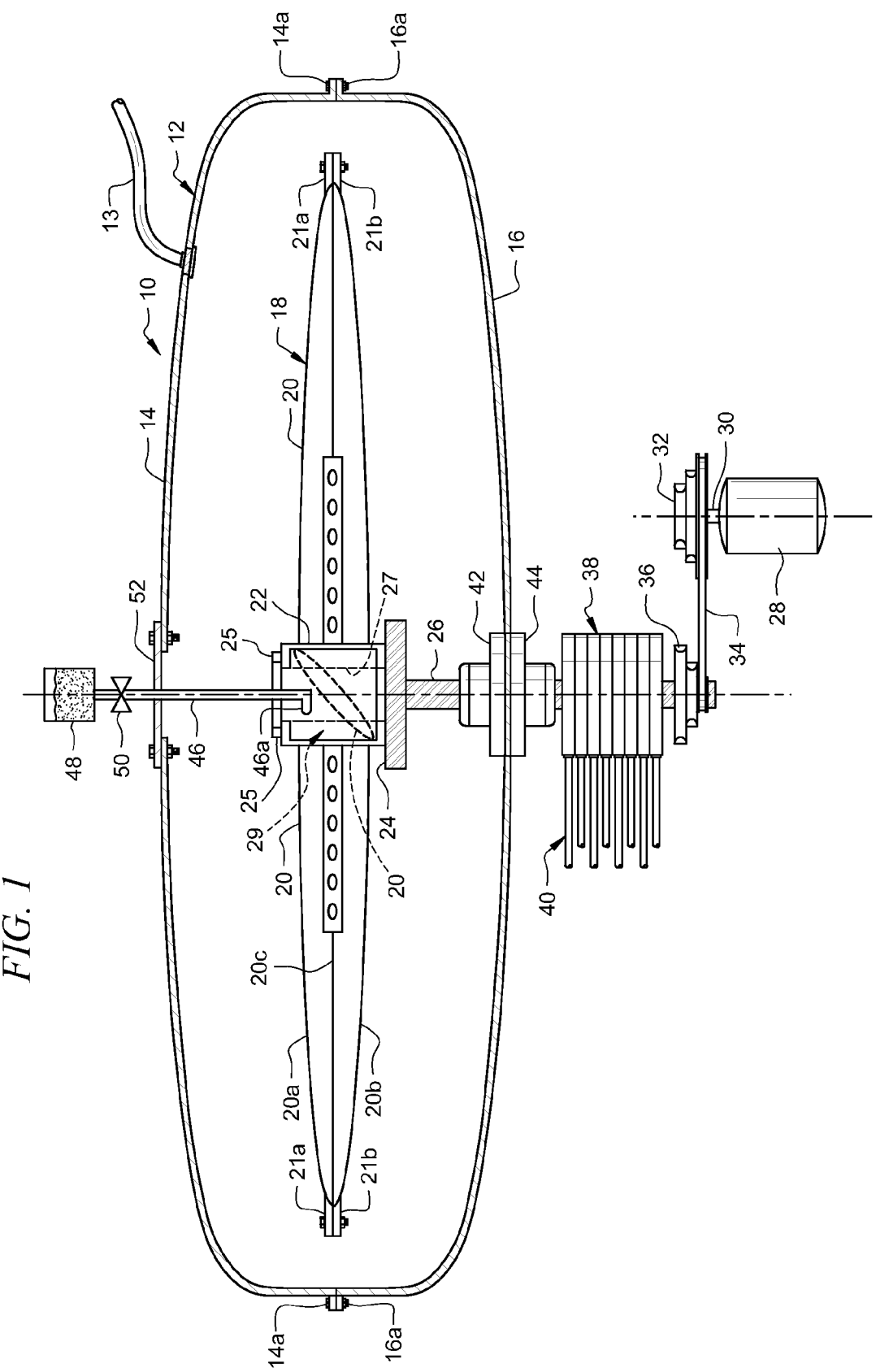
FIG. 1 is a side sectional view of a first embodiment of the novel mold assembly.

Referring now to FIG. 1, it will there be seen that a first illustrative embodiment of the invention is denoted as a whole by the reference numeral 10.

Mold assembly 10 includes a stationary, non-rotating vacuum chamber 12 defined by vacuum chamber top piece 14 and vacuum chamber bottom piece 16 that share a common structure and cooperatively confront one another to form said vacuum chamber. Top piece 14 includes radially-outwardly extending annular flange 14a and bottom piece includes radially-outwardly extending annular flange 16a. Said flanges abut one another and are positioned on opposite sides of the horizontal axis of symmetry of vacuum chamber 12. Air is pumped from vacuum chamber 12 through hose 13 which is in fluid communication with a source of negative pressure, not shown.

In this illustrative embodiment, a mold 18 for making a four-blade fan of the type having utility in wind farms, cooling towers, ventilation systems, hydroelectric turbines, counter rotating compressor blades and the like is mounted for rotation within vacuum chamber 12. The number of blade molds 20 is not critical, nor is the shape and side thereof; four generic blades are shown for illustrative purposes. Each blade mold 20 has an upper part 20a and a lower part 20b that meet along parting line 20c. Flange 21a is formed integrally with and circumscribes top part 20a and flange 21b is formed integrally with and circumscribes bottom part 20b. Said flanges are bolted or otherwise secured together to prevent separation of top part 20a and bottom part 20b during the molding process. After the process is completed, the bolts or other clamping means are removed from said flanges so that mold top and bottom parts 20a, 20b can be separated from one another so that the completed product can be removed.

Central drum 22 is supported by flat platform 24 that surmounts upstanding shaft 26 and rotates conjointly therewith. Collectively, platform 24 and shaft 26 are known in the industry as a drive dog.

Rotation of drive dog shaft 26 and hence rotation of blade mold 18 is caused by motor 28 having output shaft 30 to which is secured first speed regulating step pulley 32, also known as a variable speed pulley. Any other variable speed drive or speed reducing means is within the scope of this invention. Belt 34 interconnects first speed regulating step pulley 32 to second speed regulating step pulley 36 that is keyed to drive dog shaft 26 for conjoint rotation therewith.

A plurality of couplers and shaft seals, collectively denoted 38, is centrally apertured to receive drive dog shaft 26 and is slideably and sealingly but not fixedly connected thereto. Said couplers and shaft seals 38 do not rotate because they are in fluid communication with a plurality of air and hydraulic hoses, collectively denoted 40, that are not mounted for rotation. Said air and hydraulic hoses are connected at their respective, unillustrated proximal ends to suitable stationary sources of compressed air and hydraulic fluid, respectively. The use of hoses 40 is not depicted. The vacuum chamber can also be used with prepreg and thermoset resin as well as ceramic and ceramic composite materials. Hoses 40 are used when thermal set resins and prepeg are used. Hoses 40 are also used when large structures are blow molded using the novel apparatus.

An opening is formed in the center of vacuum chamber bottom piece 16 to accommodate drive dog rotating shaft 26. The opening is sealed internally of vacuum chamber 12 by internal seal 42 having bearing packing glands therewithin and the opening is sealed externally of vacuum chamber 12 by external seal 44 having bearing packing glands therewithin.

An opening is formed in the center of vacuum chamber top piece 14 to accommodate resin tube 46. Resin reservoir 48, adapted to contain resin 49, surmounts resin tube 46 and the flow rate of resin from said reservoir into said tube is under the control of manually-operated valve 50. A sheet of centrally-apertured Plexiglas® 52 is bolted to an exterior surface of said top piece 14 to reinforce said top piece at the point of entry of said resin tube. It also enables a user to look into the mold to see if central drum 22 is full of resin. Bearing packing glands are provided where the opening is formed for resin tube 46 because said resin tube rotates as the resin flows therethrough to fill central drum 22. Ceramic composite materials may be used instead of resins.

Resin in reservoir 48 can be pumped at any pressure into the central drum by metering catalyzing mixing dispenser. Accordingly, the resin feed is accomplished under active positive control as distinguished from a feed that results passively from gravity and atmospheric pressure. Both passive and active feeds are within the scope of this invention.

Figure 2A:
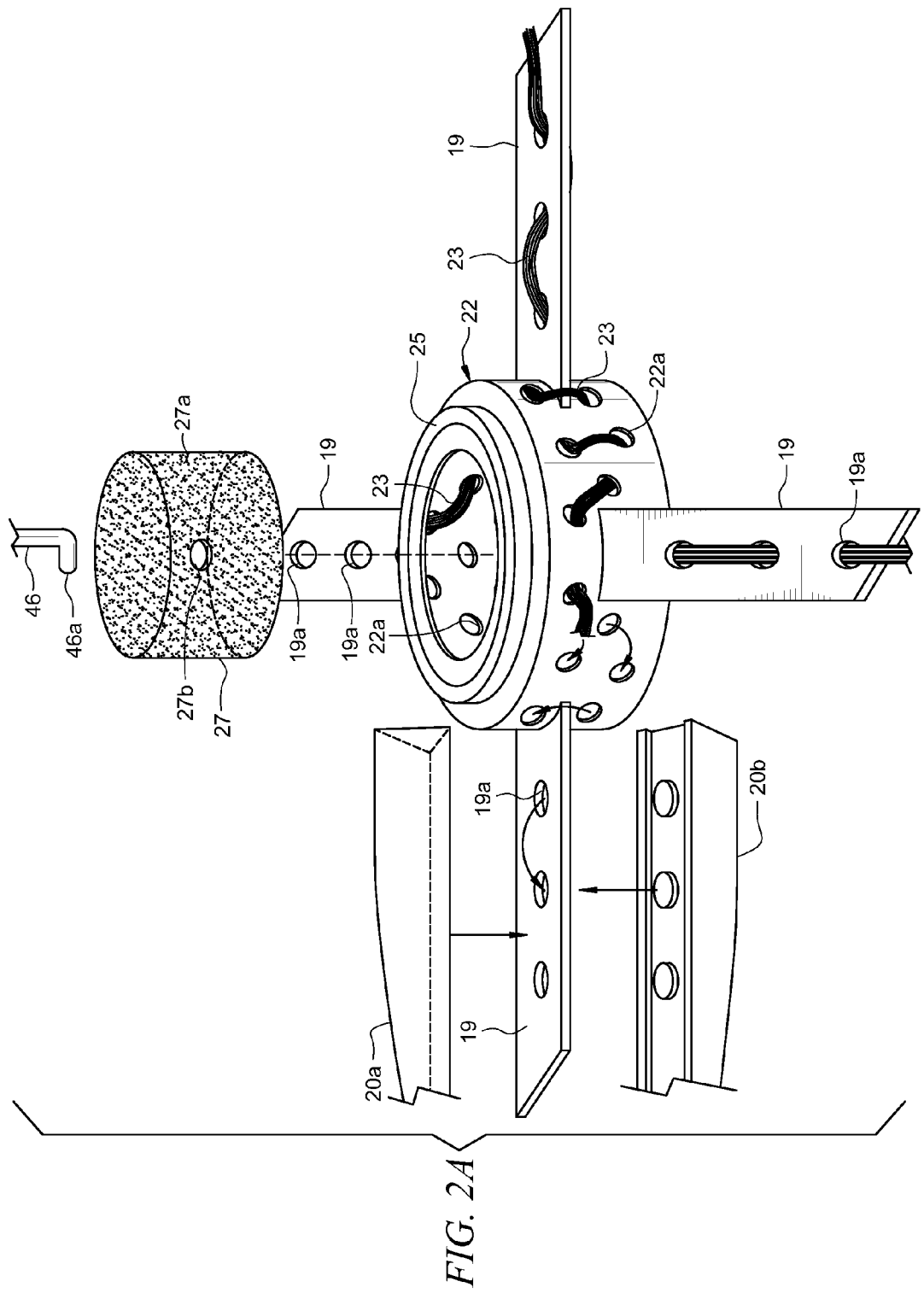
FIG. 2A is an exploded perspective view of the central drum and struts welded thereto with the micro-perforated cylinder depicted outside of said central drum.
Figure 3A:
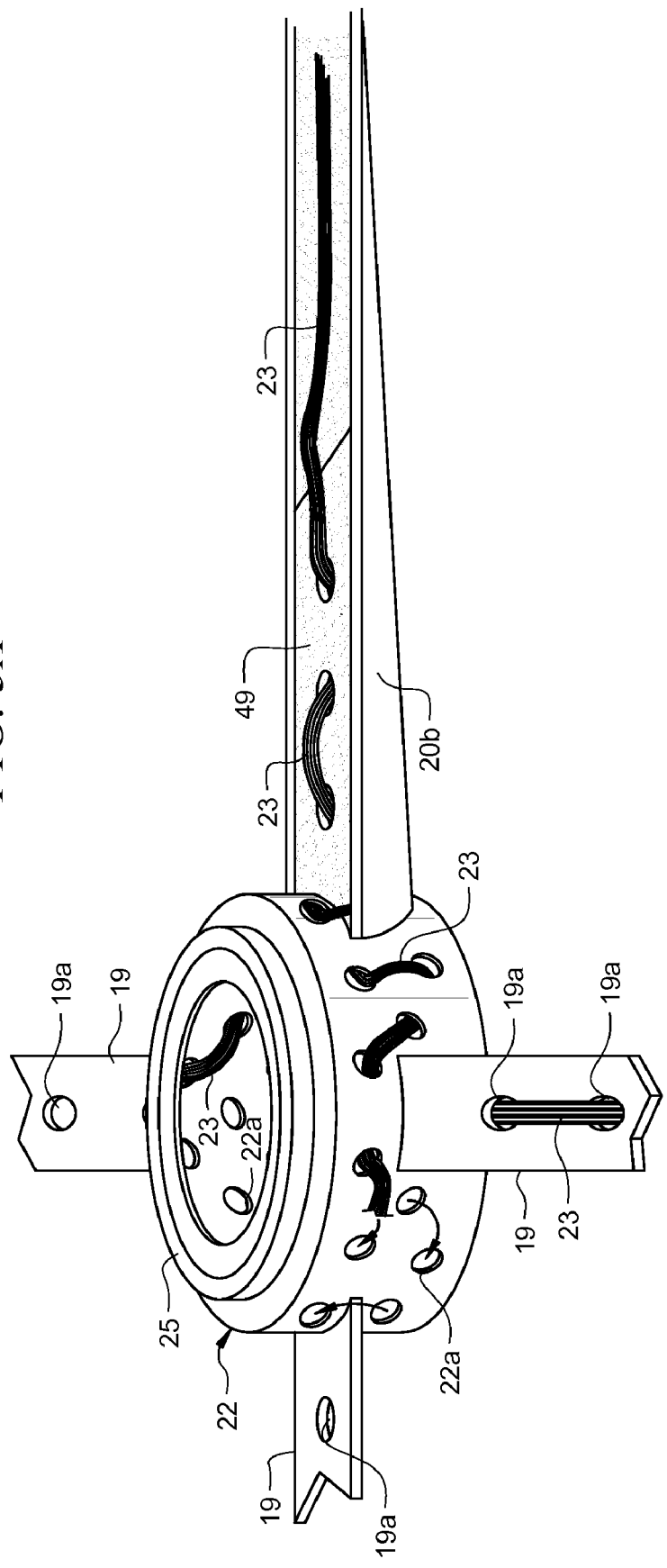
FIG. 3A is perspective view like FIG. 2A but including a bottom blade mold filled with resin.
Figure 3B:
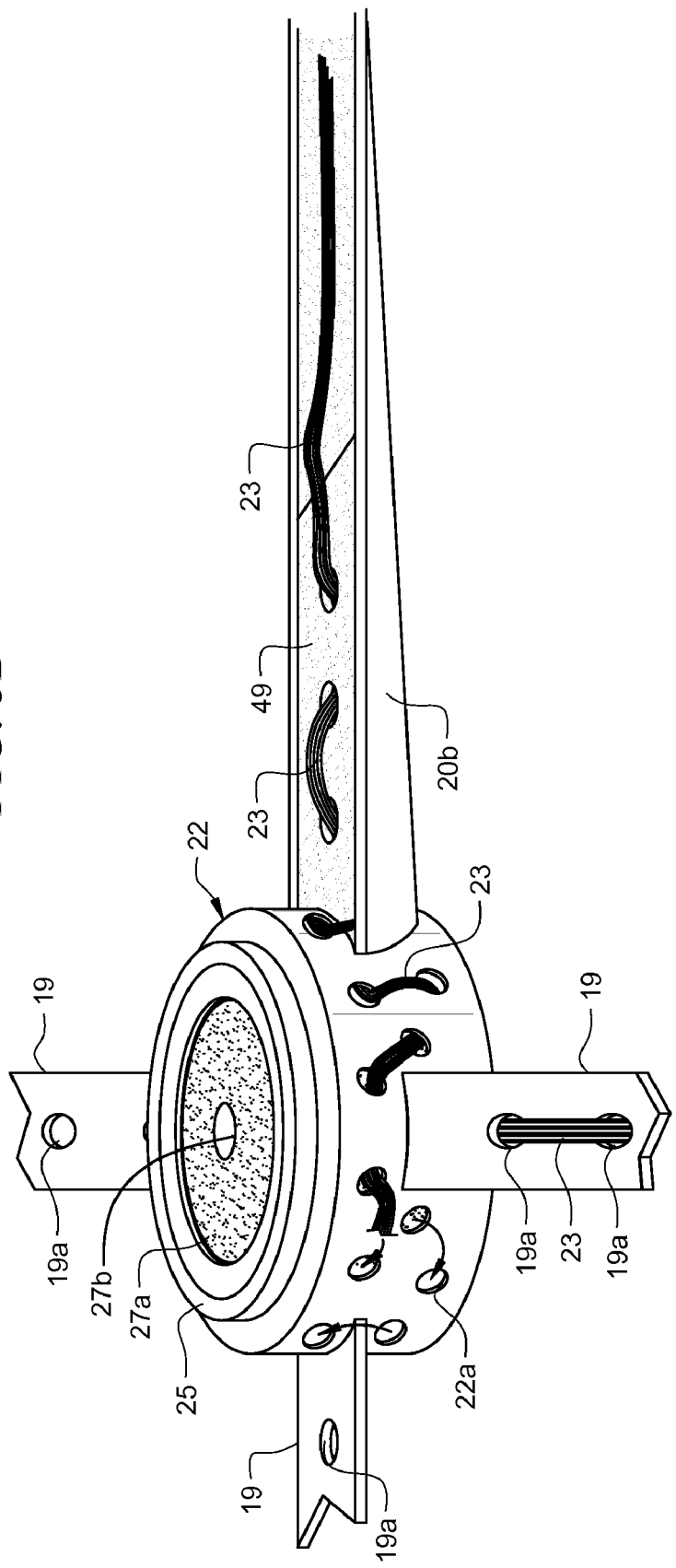
FIG. 3B is a perspective view like FIG. 3A but with the micro-perforated cylinder of the first embodiment positioned concentrically within the central drum.

As best understood in connection with FIGS. 2A, and 3A, 3B, central drum 22 is substantially cylindrical in configuration and has a plurality of openings, collectively denoted 22a, formed in its cylindrical sidewalls. The openings are provided so that preformed woven glass 23 may be woven therethrough and so that resin may flow through said openings. The glass is preferably unidirectional and biaxial winding glass.

Figure 2B:
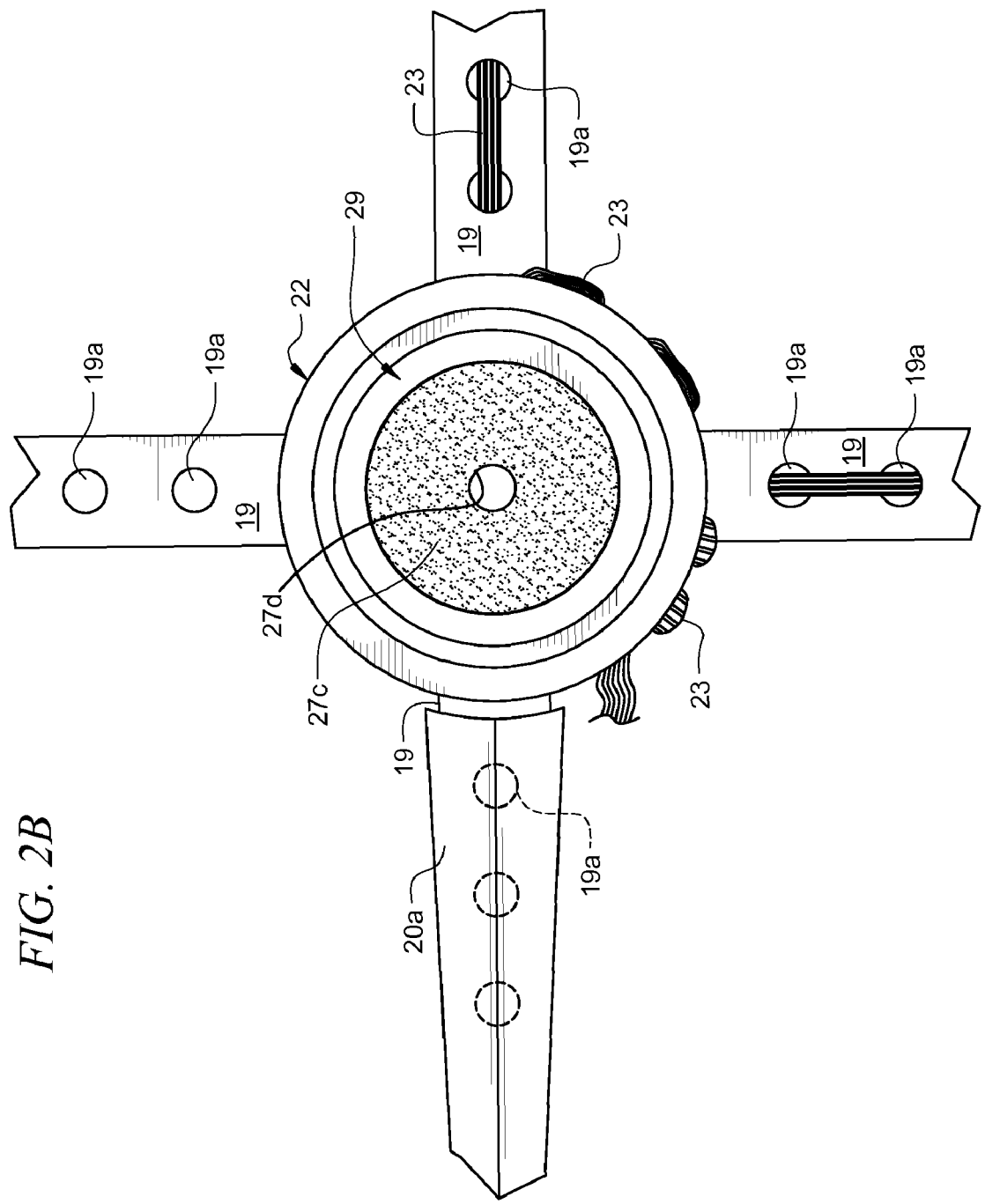
FIG. 2B is a top plan view of a second embodiment depicting the central drum and a micro perforated cover for the central opening of the central drum.

Cylinder 27 of the first embodiment has a diameter less than a diameter of central drum 22 and is positioned concentrically within central drum 22. It is pressed, welded, or glued into said position. A laser is used to form a large plurality of micro holes or micro perforations 27a in cylinder 27. The size, number, and density of such micro holes will vary greatly from application to application, i.e., the size of the item being molded will dictate the size, number, and density of the micro holes. In addition to the very small openings formed throughout cylinder 27, there is one (1) large (an inch or more in diameter) opening 27b formed in said cylinder as depicted in FIG. 2B so that resin charged into the space bordered by cylinder 27 can flow out of said space through said opening 27b and into toroidal space 29 between cylinder 27 and central drum 22. The preformed woven glass 23 that is woven through openings 22a formed in central drum 22 is confined to said toroidal space, i.e., said preformed woven glass does not extend into the interior of cylinder 27.

FIG. 2B depicts the second embodiment where micro perforated cylinder 27 is eliminated. The open top in central drum 22 is closed with a flat, micro perforated closure means 27c having central aperture 27d formed therein to accommodate resin tube 46. Closure means 27c prevents overflow of resin from central drum 22. There is no toroidal space 29 in this embodiment, but resin charged into the hollow interior of central drum 22 flows through openings 22a into the blade molds as in the first embodiment.

In both embodiments, the preformed woven glass is woven through openings 22a to hold the preformed woven glass in place. This prevents centrifugal force from pulling the preformed woven glass radially outward.

A predetermined number of stainless steel struts, collectively denoted 19, are welded to drum 22 in radial relation thereto. Each strut 19 has several large openings, collectively denoted 19a, formed in it along its extent.

Glass 23 that is woven through openings 22a formed in central drum 22 is also woven through openings 19a formed in struts 19. Struts 19 may extend all the way to the end of their associated blade molds 20, or they may extend any fractional part thereof. In this particular embodiment, each strut 23 extends about half-way between central drum 22 and the radially outermost end of its associated blade mold 20. Woven glass 23, however, extends all the way to the radially outermost end of each blade mold 20.

Centrifugal forces acting on the resin collected in central drum 22 causes the resin to migrate radially outwardly from toroidal space 29 along the entire extent of woven glass 23. The resistance to such outward flow is nominal in view of the vacuum created prior to introduction of resin. In this way, resin is carried all the way to the end of each blade mold 20.

Annular dam 25, depicted in FIGS. 2A, 3A and 3B, is built along a top wall of central drum 22 in surrounding relation to the central opening of the drum to prevent resin 49 from spinning out of toroidal space 29 if said toroidal space overflows.

Core material may also be provided with struts 19 and woven glass 23 to facilitate construction of the final product within the mold.

Atmospheric pressure acting on resin 49 in reservoir 48, or pressure provided by a pumping system as mentioned above, pushes the resin or other moldable material into the hollow interior of cylinder 27. A pump may be supplied so that the resin is charged into said hollow interior at a pressure greater than atmospheric pressure. Centrifugal force causes the resin to exit cylinder 27 through large opening 27b and to flow radially outwardly along the extent of toroidal space 29 and hence openings 22a and along the length of each bundle of woven glass 23. The resin accumulates on and conforms to the shape of the interior of each blade mold 20. The vacuum in vacuum chamber 12 also enables mold 18 to spin at a high rotational velocity so that the centrifugal forces are high.

Hydraulic hoses and couplers 40, mentioned above, are needed when a particular molding technique requires heating fluids, cooling fluids, hydraulic power, air pressure, and the like. Molding compounds such as ceramic and ceramic composites, for example, have widely varying needs that are met by such hoses and couplers 40.

When resin fills cylinder 27 and toroidal space 29, i.e., when the resin level begins to climb relative to annular dam 25, the operator knows that each blade mold 20 has accepted its maximum amount of resin 49 and motor 28 is shut down. Micro perforated cylinder 27 prevents mold 20 from accepting further resin when the mold is full. The bolts or other clamps are removed from flanges 21a, 21b and the finished product is removed from the mold.

Significantly, the resin inside toroidal space 29 is formed integrally with the resin that impregnates woven glass 23. The welded joint between each strut 19 and central drum 22 is thus reinforced by the resin in toroidal space 29. The resin enters into the micro perforations of cylinder 27 before curing. Each blade is therefore integrally formed with said cylinder, thereby overcoming the blade/hub separation problem of the prior art. Micro perforated cylinder 27 provides the needed flow-stopping characteristics.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A mold assembly, comprising:
   a central drum having cylindrical sidewalls, a bottom wall, an open top, and a hollow interior;
   a plurality of hollow blade molds disposed in circumferentially spaced relation to one another about said central drum and in radial relation to a longitudinal axis of said central drum;

each of said hollow blade molds including a top piece and a bottom piece that abut one another along a parting line when placed into confronting relation to one another, said top and bottom pieces adapted to be releasably secured to one another;

a plurality of struts secured to said central drum in circumferentially spaced relation to one another and in radial relation to said longitudinal axis of said central drum;

a plurality of openings formed in said cylindrical sidewalls of said central drum;

a plurality of openings formed in each strut of said plurality of struts;

a plurality of elongate bundles of woven glass;

each elongate bundle of woven glass of said plurality of elongate bundles extending through at least one opening of said plurality of openings formed in said central drum and through at least one opening formed in an associated strut of said plurality of struts;

each of said struts and associated bundle of woven glass being housed by an associated top piece and bottom piece of said hollow blade molds when said top and bottom pieces are placed into confronting relation with one another and releasably secured to one another;

a resin reservoir positioned externally of said vacuum chamber, said resin reservoir adapted to deliver resin to said hollow interior of said central drum;

a motor mounted outside of said stationary vacuum chamber;

said motor adapted to rotate said mold assembly;

whereby rotation of said mold causes resin in said hollow interior of said central drum to flow radially outwardly of said central drum through said openings formed in said cylindrical sidewalls of said central drum along the respective extents of said bundles of woven glass until each blade mold is filled with resin;

whereby a finished molded product having a monolithic structure is produced; and whereby said finished molded product is removed by separating each blade mold top piece from each blade mold bottom piece.

2. The mold assembly of claim 1, further comprising:

a cylinder having a diameter less than a diameter of said central drum;

said cylinder being positioned concentrically within said central drum so that a toroidal space is defined between said cylinder and said central drum;

a large opening formed in said cylinder;

said resin reservoir adapted to deliver resin to said hollow interior of said cylinder;

said resin flowing from said hollow interior of said cylinder, through said large opening formed in said cylinder, and into said toroidal space;

each bundle of said woven glass having a radially innermost part positioned within said toroidal space.

3. The mold assembly of claim 2, further comprising:

a large plurality of micro perforations formed in said cylinder;

whereby said micro perforations prevents free flow of resin into said central drum and whereby said micro perforations prevent overflow because the resin is too viscous to flow through the micro perforations.

4. The mold assembly of claim 2, further comprising:

a vacuum chamber top piece;

a vacuum chamber bottom piece;

said vacuum chamber top piece and bottom piece sharing a common structure;

a stationary, non-rotating vacuum chamber formed by positioning said vacuum chamber top piece and bottom piece in confronting relation to one another;

said mold assembly being mounted for rotation within said vacuum chamber.

5. The mold assembly of claim 4, further comprising:

a flat platform for supporting said central drum;

an upstanding shaft;

said flat platform disposed in surmounting relation to said upstanding shaft and being secured thereto for conjoint rotation therewith;

a motor for rotating said upstanding shaft;

an opening formed in a center of said vacuum chamber bottom piece to accommodate said rotating shaft, said opening being sealed to maintain a vacuum within said vacuum chamber;

a resin reservoir disposed above said vacuum chamber top piece;

a resin tube providing fluid communication between said resin reservoir and the hollow interior of said central drum;

an opening formed in a center of said vacuum chamber top piece to accommodate said resin tube, said opening being sealed to maintain a vacuum within said vacuum chamber;

said resin tube adapted to discharge resin from said resin reservoir into said hollow interior of said central drum;

whereby centrifugal forces acting on resin in said central drum urges said resin to flow radially outwardly along the length of each bundle of said woven glass to the radially outermost ends of each blade mold.

6. The mold assembly of claim 5, further comprising:

a circular dam formed along a top wall of said central drum in surrounding relation to said central opening of the central drum to prevent resin from spinning out of said toroidal space if excess resin accumulates in said toroidal space;

said micro perforated cylinder being secured to said dam to prevent overflow of said resin.

7. The mold assembly of claim 1, further comprising:

a closure means for closing said open top of said central drum;

a plurality of micro perforations formed in said closure means;

said closure means preventing overflow of resin from said central drum.

* * * * *

UNITED STATES PATENT AND TRADEMARK OFFICE
CERTIFICATE OF CORRECTION

PATENT NO. : 7,722,348 B1 Page 1 of 1
APPLICATION NO. : 11/967340
DATED : May 25, 2010
INVENTOR(S) : Marc A. Quenneville and Stephen M. Quenneville It is certified that error appears in the above-identified patent and that said Letters Patent is hereby corrected as shown below:

Title Page, Item (76) Inventors:
First inventor's name is listed as "Mac A. Quenneville" should be changed to "Marc A. Quenneville"

Signed and Sealed this

Sixth Day of July, 2010

David J. Kappos
*Director of the United States Patent and Trademark Office*